April 23, 1940.  E. KÜCHLER ET AL  2,198,542
SOFTENING WATER
Filed Jan. 11, 1937
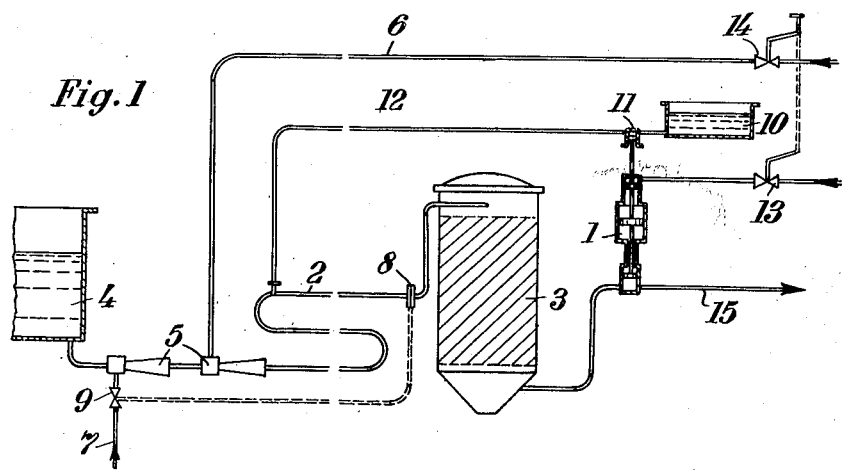
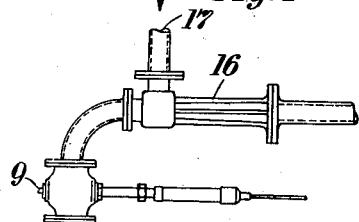
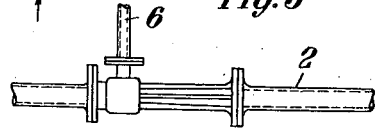
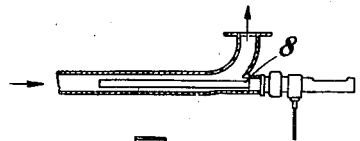
Inventors:
Erich Küchler,
Karl Hermes, and
Hans Joachim Freiherr v. Dobeneck
By E. F. Wenderoth Patented Apr. 23, 1940

2,198,542

UNITED STATES PATENT OFFICE 2,198,542

SOFTENING WATER

Erich Küchler, Budenheim, near Mainz, Karl Hermes, Mainz, and Hans Joachim Freiherr von Dobeneck, Budenheim, near Mainz, Germany, assignors to Chemische Fabrik Budenheim Aktiengesellschaft, Mainz, Germany Application January 11, 1937, Serial No. 120,078
In Germany January 17, 1936

8 Claims. (Cl. 210—40)

This invention relates to a process for the softening of water and more particularly concerns a process for the softening of boiler-feed water for locomotive boilers, ship's boilers and similar uses.

A process for continuous softening of boiler-feed water is known, according to which the precipitation of the hardening constituents is effected in a non-heated system of pipes, through which the water is made to flow at a rate producing turbulent currents. For practical reasons the process is preferred for pre-softening by means of alkaline-reacting residual boiler water and for removing the last residual hardness by means of alkali phosphate. For carrying the process into effect, an apparatus may be used in which a non-heated system of pipes, preferably provided with a plurality of bends, and a filter continuous thereof are arranged intermediate the feed pump and the boiler. The residual boiler water or the chemicals for precipitating the hardening constituents are fed into the apparatus by means of suitable pumps; further, the steam required for heating may be injected into the pipe system by means of a mixing nozzle.

It is an object of the present invention to provide a plant for continuous softening of water, more particularly for softening boiler-feed water, which plant can be operated also within a restricted space, and in which plant the softening process is carried into effect under relatively low pressure.

A further object of this invention is the control, in dependent relation to the quantity of water fed into the boiler by means of the feed pump, of the quantity of the supplied crude water and of the quantity of softening chemicals, preferably residual alkaline boiler-water and alkali phosphate.

In the installation, according to the invention, the softening apparatus consisting of a system of pipes having a plurality of bends and windings, is arranged as a closed system at the suction side of the feed pump. In this way, on the one hand, the pressure prevailing in the softening liquid is made independent from the pressure in the boiler; on the other hand, the softening apparatus, if employed on locomotives, can be placed upon or into the tender, so that on the locomotive no room need be provided for the softening device.

The softening process is carried out in the installation in two stages. It is of advantage to pre-soften by means of alkaline-reacting residual boiler-water, which is admixed with the crude water before or when the latter enters the softening pipe. The complete softening is effected by means of alkali phosphate, more particularly by means of trisodium phosphate, preferably at higher temperatures such as e. g. 70° and higher.

The crude water, the liquid serving for pre-softening and the steam required for heating, are supplied to the softening pipe, provided with windings and bends, by means of a feeding device adapted to produce on the suction side of the pump a certain pressure sufficient to maintain the suction effect of the pump notwithstanding the raised temperature of the water. In the best modification known to us, a system of nozzles is used, having two injector-type nozzles. The chemicals used for complete softening, such as e. g. a trisodium phosphate solution, are introduced into the pre-softened water, on its passage through the pipe system, by means of a dosage pump.

The subsequent complete softening process takes place in the last section of the pipe system. The precipitated hardening constituents are removed by means of a filter continuous to the pipe system; the softened water is drawn by means of the suction pump and is fed into the boiler.

The output of the nozzle system or similar device arranged at the beginning of the softening pipe, is controlled by a regulating device, such as e. g. a thermostat positioned in the softening pipe, preferably at a short distance before the filter. The system of nozzles produces, at the suction side of the feed pump, a certain amount of pressure sufficient to overcome the resistances in the softening pipe system and in the filter in the flow of the water from the crude water container to the feed pump. This pressure, which is, however, considerably lower than the boiler pressure, assures the suction effect or output of the feed pump notwithstanding the relatively high temperature of the softened water; an interruption of the water current flow is thereby obviated.

In order to eliminate trouble also at changing loads on the locomotive, means have been provided, besides the said control of the nozzle system by means of a regulating device, to assure automatic dependency of the boiler water return valve from the load on the feed pump. In addition, the device for dosing the water softening chemicals has been made dependent from the quantity of water supplied per hour, e. g. by coupling the said device to the feed pump, so that throttling the said pump will produce automatically a reduction of the supply of the softening medium.

A modification of the softening apparatus, according to the invention, is further described below with reference to the accompanying drawing, in which Fig. 1 is a diagrammatical representation of the entire softening plant;

Figs. 2 and 3 illustrate in an enlarged scale the two nozzles of the nozzle system 5, according to Fig. 1;

Fig. 4 shows, on an enlarged scale, a cross section through the regulating device 8, according to Fig. 1, and Fig. 5 is a view of another suitable regulating device.

The softening apparatus proper comprises, according to Fig. 1, a pipe system 2 positioned at the suction side of feed pump 1, with a filter 3 arranged contiguously thereto. The crude water is introduced into the softening pipe 2 from the tank 4 by way of the nozzle system 5. In the nozzle system the crude water is admixed with the residual boiler water or waste steam, respectively, supplied through the boiler-water return-pipe 6 or the steam-pipe 7, respectively. The nozzle system 5 is controlled through the regulating device 8 by means of the valve 9 positioned in the steam pipe 7. The solution serving for subsequent softening is introduced, preferably at a bend, into the softening pipe 2 from the container 10 by way of the dosage pump 11 and pipe 12. The feed pump 1 is controlled by the pump steam valve 13, whereby also the return of the boiler water is controlled at the same time by valve 14. The softened water is passed by way of the pressure pipe lead 15 into the preheater or into the boiler.

Fig. 2 illustrates the left side nozzle of the two nozzles of the nozzle system 5 according to Fig. 1. It operates on the principle of the steam jet injector. Injector 16, which is actuated by the steam necessary for heating the water to the required reaction temperature, draws the crude water by suction from the water tank 4 (Fig. 1) through pipe line 17 and forces it through the second nozzle into the pipe system 2 (Fig. 1). Hereby a pressure is set up in the pipe system 2, which serves to overcome the frictional resistance in the pipe line and filter, and which also produces a definite statical head for assisting the suction effect of the pump. The quantity of steam required for operating injector 16 and for heating the crude water, is regulated by means of the automatically controlled steam valve (9). The controlling mechanism is actuated either by electricity or hydraulic power (by means of an expansion liquid) by a control device 8 incorporated at the end of pipe system 2 (see Fig. 1).

In Fig. 3 is represented the nozzle of similar construction positioned to the right, of the nozzle system 5 as per Fig. 1, which nozzle produces a silent admixture of the expanding returned boiler water with the crude water.

The regulation of steam valve 9 (Figs. 1 and 2) is effected, according to Fig. 4, by means of a thermostat, the principal object of which is to maintain the necessary reaction temperature of at least 70°. An increase of the feed pump output causes a decrease of the pressure in pipe system 2 anterior to the pump and, consequently, an increased output of injector 16. Whereas the quantity of the heating steam has so far not changed, the temperature of the water in the pipe system 2 drops. The thermostat 8 restores again, by opening the valve 9 of the heating steam, the previous conditions of temperature and pressure. When throttling the feed pump, the process takes place in the reverse order.

In the same way as done by means of a thermostat according to Fig. 4, the pressure for overcoming the resistances and the necessary reaction temperature in pipe system 2 may be adapted to the varying output of the feed pump 1 by means of a pressure regulator according to Fig. 5 containing a membrane by means of which the valve 9 is throttled in the known manner when the pressure increases in the pipe 2 and is opened when the pressure decreases.

The mode of operation of the softening plant is elucidated in detail in the following description of the three cases possible during the run of the locomotive.

1. Normal case

The nozzle system 5 controlled by regulator 8 supplies to the pipe system 2, while admixing returned or residual boiler water, as much crude water as is received in a purified state by pump 1 at the opposite side. The output of the nozzle system 5 has meanwhile been adjusted so, that the water is heated to 70° C. A definite pressure prevails in pipe system 2, i. e. on the pressure side of the feed pump.

2. Feed pump throttled

If the feed pump 1 is throttled, a higher pressure should arise in the pipe system 2 if merely the feed pump were throttled. In this case the quantity passing the nozzles would be reduced and the temperature would drop. Regulator 8, however, controls the nozzle system 5 by throttling the heating steam (valve 9) and restores the temperature and pressure. The feed pump is throttled in that the steam valve 13 of the pump is closed partly or entirely. In forced co-operation with the throttling of the pump steam valve 13 the corresponding throttling of the returning boiler water is effected. The feed pump 1, however, is also in operative connection with the quantity measuring pump 11 for the trisodium phosphate solution, with the result that in the same sense the supply of the trisodium phosphate is reduced or ceases entirely.

3. Increase of pump output

If more steam is supplied to the pump, so that pump 1 is working at a higher speed, the pressure and resistances in the softening pipe 2 and in filter 3 decrease. In consequence, the output of the nozzle system 5 increases. In dependency herefrom, the temperature should drop. In accordance with the novel arrangement the regulator 8 is controlling the nozzle system and restores the required temperature and the corresponding pressure. At the same time, and in the sense corresponding with the throwing open of the valve 13 of the steam pump, also the valve 14 for the return of the boiler water is opened. With the accelerated up-and-down movement of the pump piston a correspondingly increased quantity of trisodium phosphate is supplied to the softening pipe 2 by the more rapid action of the dosage pump 11.

When working with the novel apparatus the softening, notwithstanding the use of a closed system, is carried through at a pressure far below the boiler pressure, e. g. one atmosphere over atmospheric pressure. It has proved a matter of surprise, that in this, very favourable results are obtained with regard to rapidity of reaction and filtering capacity.

We claim:

1. Device for softening water, more particularly boiler feed water, comprising in combination, a pipe, a filter, a feed pump, a second pipe connecting the said filter and the said pump, the said pipes and the filter being positioned at the suction side of the pump, injectors adapted to inject crude water, steam and an alkaline solution into the first mentioned pipe, means connected with the said injectors for introducing crude water, steam and alkaline solutions respectively into said injectors, and means for introducing an alkali phosphate solution into the pipe intermediate said injectors and the filter.

2. Device for softening boiler feed water comprising in combination, a pipe having a plurality of bends, a filter at one end of this pipe, injectors at the other end of the pipe, a feed pump, connection means between the suction side of said pump and the filter, means for introducing steam, crude water and alkaline softening liquid into said injectors, means for introducing alkali phosphate solution into the pipe having bends intermediate the injectors and filter, and means for controlling the quantity of alkaline softening liquid introduced by means of the injectors into the pipe provided with bends in dependency from the quantity of water drawn by suction through the feed pump.

3. Device for softening boiler feed water comprising in combination, a pipe having a plurality of bends, a filter at one end of this pipe, injectors at the other end of the pipe, a feed pump, connection means between the suction side of said pump and the filter, means for introducing steam, crude water and alkaline softening liquid into said injectors, means for introducing alkali phosphate solution into the pipe having bends and intermediate said injectors and filter, and means for controlling the supply of steam to the said injectors in dependency from the temperature of the alkali phosphate containing liquid passing through the pipe having bends.

4. Device for softening boiler feed water comprising in combination, a pipe having a plurality of bends, a filter at one end of this pipe, injectors at the other end of the pipe, a feed pump, a steam valve controlling said pump, connection means between the suction side of the said pump and the filter, means for introducing steam, crude water and alkaline softening liquid into the injectors, means for introducing alkali phosphate solution into the pipe having bends intermediate one of the injectors and filter, means for varying the supply of the alkali phosphate solution in dependency from the speed of the piston of the feed pump and a valve connected with the steam valve of the feed pump and regulating the supply of the alkaline softening liquid in conformity with the output of the feed pump.

5. Device for softening boiler feed water comprising in combination, a pipe having a plurality of bends, a filter at one end of this pipe, injectors at the other end of the pipe, a feed pump, connection means between the suction side of the said pump and the filter, means for introducing steam and crude water to said injectors, means for returning alkaline boiler water from the boiler into the pipe provided with bends, means for introducing alkali phosphate solution into this pipe intermediate said injectors and filter and means for controlling the quantity of alkaline boiler water introduced by means of said injectors into the pipe provided with bends, in dependency from the quantity of water drawn by suction through the feed pump.

6. In a device for softening feed water for locomotive boilers the combination of a crude water tank, a pipe having a multiple of bends, injectors positioned intermediate the said water tank and the said pipe, a filter, a pipe line connecting the filter to the locomotive boiler and a feed pump within this pipe line, means for supplying steam to one of the said injectors, means for returning boiler water from the boiler to the other of the said injectors, a container for alkali phosphate solution, a pipe connecting the said container and the pipe provided with bends, said pipe entering intermediate said injectors and filter, a pump in this connecting pipe line, driving means in common for the said pump and the said feed pump for the boiler water, a valve in the return line for the boiler water, means for controlling this valve in a way to conform to the output of the feed pump and means for regulating the quantity of alkali phosphate supplied through one of the said injectors to the pipe provided with bends in dependency from the speed of the piston of the feed pump and a valve regulating the supply of steam to one of the said injectors in dependency from the temperature of the alkali phosphate containing liquid passing through the pipe having bends.

7. A device according to claim 5 in which a first nozzle is connected to the said means for introducing crude water and a steam pipe line, and a second nozzle positioned intermediate the said first nozzle and the pipe having bends, said second nozzle being connected to the said means for returning alkaline boiler water from the boiler.

8. Device according to claim 1 comprising a steam pipe connected to the said injectors, a valve in the said steam pipe and a thermostat connected to the pipe positioned intermediate the injectors and the filter and to the said valve adapted to vary the opening of the said valve.

ERICH KÜCHLER.
KARL HERMES.
HANS JOACHIM FREIHERR
v. DOBENECK.